(12) United States Patent
Mujtaba

(10) Patent No.: US 6,542,485 B1
(45) Date of Patent: Apr. 1, 2003

(54) METHODS AND APPARATUS FOR WIRELESS COMMUNICATION USING TIME DIVISION DUPLEX TIME-SLOTTED CDMA

(75) Inventor: Syed Aon Mujtaba, Berkeley Heights, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/200,522

(22) Filed: Nov. 25, 1998

(51) Int. Cl.[7] .............................................. H04B 7/216

(52) U.S. Cl. ................... 370/335; 370/337; 370/342; 370/347; 455/422; 375/146; 375/147

(58) Field of Search ........................ 370/320, 342–347, 370/335–337, 441, 479, 280, 310; 455/422–425; 375/146–147

(56) References Cited

U.S. PATENT DOCUMENTS

| | | | | |
|---|---|---|---|---|
| 5,420,851 A | * | 5/1995 | Seshadri et al. | 370/280 |
| 5,548,582 A | | 8/1996 | Brajal et al. | |
| 5,663,990 A | | 9/1997 | Bolgiano et al. | |
| 5,680,388 A | | 10/1997 | Kåhre | |
| 5,719,899 A | | 2/1998 | Thielecke et al. | |
| 6,005,516 A | * | 12/1999 | Reudink et al. | 342/375 |
| 6,005,854 A | * | 12/1999 | Xu et al. | 370/335 |
| 6,101,176 A | * | 8/2000 | Honkasalo et al. | 370/335 |
| 6,115,370 A | * | 9/2000 | Struhsaker et al. | 370/342 |
| 6,118,767 A | * | 9/2000 | Shen et al. | 370/252 |
| 6,141,565 A | * | 10/2000 | Feuerstein et al. | 455/560 |
| 6,144,645 A | * | 11/2000 | Struhsaker et al. | 370/280 |
| 6,167,036 A | * | 12/2000 | Beven | 370/331 |
| 6,181,276 B1 | * | 1/2001 | Schlekewey et al. | 342/372 |
| 6,347,234 B1 | * | 2/2002 | Scherzer | 455/462 |
| 6,393,303 B1 | * | 5/2002 | Katz | 455/562 |

FOREIGN PATENT DOCUMENTS

WO   WO 98/27669   6/1998

OTHER PUBLICATIONS

M. Mahmoudi, E. S. Sousa, and H. Alavi, "Adaptive Sector Size Control in a System Using Butler Matrix", IEEE 1999, pp. 1355 1359.*

H. Sano, H. Murai, and M. Miyake, "Performance of Beam–Combining Scheme for DS–CDMA Using Weighting Factor based on Interference Level", IEEE 1999, pp. 993–997.*

A. Sabharwal, D. Avidor, and L. Potter, "Sector Beam Synthesis for Cellular Systems Using Phased Antenna Arrays", IEEE Vo 49, No. 5, Sep. 2000, pp. 1784–1792.*

(List continued on next page.)

Primary Examiner—Hassan Kizou
Assistant Examiner—Thai D Hoang
(74) Attorney, Agent, or Firm—Ryan, Mason & Lewis, LLP

(57) ABSTRACT

Methods and apparatus for wireless communication in systems such as omni-beam and narrow-beam fixed wireless loop (FWL) systems. In a first technique in accordance with the invention, referred to as code division duplex (CDD) time-slotted CDMA, uplink and downlink portions of the system are separated using code division duplexing, while the users within a given cell are also separated using codes, e.g., using time-slotted CDMA. In a second technique in accordance with the invention, referred to as time division duplex (TDD) time-slotted CDMA, uplink and downlink portions of the system are separated using time division duplexing, e.g., time slots, while the users in a given cell are separated using codes, e.g., time-slotted CDMA. Both the CDD and TDD techniques may make use of an electronically-steered beam which is designed to provide simultaneous coverage within a given cell for two or more users separated by codes. In a third technique in accordance with the invention, referred to as orthogonal frequency division multiplexing (OFDM), uplink and downlink portions of the system are separated in frequency, while the users are, e.g., also separated in frequency.

18 Claims, 12 Drawing Sheets

OTHER PUBLICATIONS

M. L. Moher, "Multiuser Decoding for Multibeam Systems", IEEE vol. 49, No. 4, Jul. 2000, pp. 1226–1234.*

M. Ericson, A. Osseiran, J. Barta, B. Goransson, and B. Hagerman, "Capacity Study for Fixed Multi Beam Antenna Systems in Mixed Service", IEEE 2001, pp. A–31–A–35.*

Y. Hara, R. Yonezawa, and I. Chiba, "On the Capacity of Cellular CDMA Systems with Multibeam Antennas", IEEE 1998, pp. 764–768.*

G.J.R. Povey et al., "A Review of Time Division Duplex–CDMA Techniques," IEEE International Symposium on Spread Spectrum Techniques and Applications (ISSSTA), vol. 2, pp. 630–633, 1998.

A. Papathanassiou et al., "Multi–User Direction of Arrival and Channel Estimation for Time–Slotted CDMA with Joint Detection," Digital Signal Processing Proceedings, IEEE, pp. 375–378, Jul. 2, 1997.

* cited by examiner

METHODS AND APPARATUS FOR WIRELESS COMMUNICATION USING TIME DIVISION DUPLEX TIME-SLOTTED CDMA

RELATED APPLICATIONS

The present application is related to the following U.S. patent applications, both filed concurrently herewith in the name of inventor Syed Aon Mujtaba: U.S. patent application Ser. No. 09/200,523 entitled "Methods and Apparatus for Wireless Communication Using Orthogonal Frequency Division Multiplexing," and U.S. patent application Ser. No. 09/200,521 entitled "Methods and Apparatus for Wireless Communication Using Code Division Duplex Time-Slotted CDMA."

FIELD OF THE INVENTION

The present invention relates generally to communication systems, and more particularly to wireless communication systems such as code division multiple access (CDMA) systems for fixed wireless loop (FWL) and other applications.

BACKGROUND OF THE INVENTION

FIG. 1 shows a portion of a conventional omni-beam FWL system 10. The portion of system 10 shown includes four hexagonal cells 12-1, 12-2, 12-3 and 12-4, each with a corresponding base station 14-1, 14-2, 14-3 and 14-4, and a subscriber unit 16. The system 10 will generally include numerous additional cells, base stations and subscriber units configured in a similar manner. It is assumed in this system that the base stations are equipped with omni-directional antennas, and that the positions of the subscriber units are fixed. The base station 14-3 of FIG. 1 is in communication with the subscriber unit 16 in cell 12-3, e.g., for providing a communication channel for an on-going voice or data call. The omni-beam FWL system 10 may be configured using a number of different techniques.

FIG. 2 shows an example of how the omni-beam FWL system 10 may be implemented using a time division multiple access (TDMA) technique such as that used in the Digital European Cordless Telephone (DECT) standard. In accordance with this TDMA technique, different frequencies are used for the different cells, such that among the cells, users are separated in frequency. A suitable frequency reuse pattern, e.g., a seven-cell hexagonal reuse pattern, may also be used in order to limit the number of different frequencies required. Within a given cell, users are separated in time through the use of a sequence of time slots 20, including time slots 22-1, 22-2, ... 22–N. The system 10 may also be implemented using a code division multiple access (CDMA) technique. In accordance with this technique, the same frequencies but different codes are used for each of the cells, such that the codes are used to separate users in different cells and within a given cell. Some frequency separation may also be used in conjunction with the code separation in order to reduce interference from other cells. Additional details regarding conventional CDMA systems are described in, for example, Andrew J. Viterbi, "CDMA: Principles of Spread Spectrum Communication," Addison-Wesley, 1995, which is incorporated by reference herein. Other conventional CDMA systems are described in, for example, TIA/EIA/IS-95A, "Mobile Station—Base Station Compatibility Standard for Dual-Mode Wideband Spread Spectrum Cellular System," June 1996, and ANSI J-STD-008, "Personal Station—Base Station Compatibility Requirements for 1.8 to 2.0 GHz Code Division Multiple Access (CDMA) Personal Communication Systems," both of which are incorporated by reference herein.

FIG. 3 shows a conventional narrow-beam FWL system 30. The portion of system 30 shown includes four hexagonal cells 32-1, 32-2, 32-3 and 32-4, each with a corresponding base station 34-1, 34-2, 34-3 and 34-4. In this system, it is again assumed that the positions of the subscriber units are fixed. The base stations in system 30 are equipped with directional antennas which generate narrow beams 36. At any given time, only a subset of the total number of beams in the system is active, i.e., communicating with users. The beams 36 are made as narrow as possible in order to target only a single user, and thereby minimizing inter-cell interference. In order to provide an increased capacity, the system 30 may be configured such that all cells use the same frequencies, i.e., a frequency reuse factor of 1. FIG. 4 shows an alternative implementation in which a given cell 42-i includes nine electronically-steerable narrow beams 46. The beams 46 are separated into three sectors, each including three beams designated 1,2 and 3. This provides a more manageable hopping pattern, e.g., turning on a designated single beam within each sector at any given time.

FIGS. 5 and 6 illustrate the difference between sectorization and steerable beams in a narrow-beam system such as system 30 of FIG. 3, which assumes a frequency reuse factor of 1. FIG. 5 shows a pair of sectorized cells 50-1 and 50-2 having base stations 52-1 and 52-2, respectively. In this example, a beam 53 from one of six sectors of the cell 50-1 and a beam 55 from one of the six sectors of the cell 50-2 will generate co-channel, i.e., inter-cell, interference. If the beams are sectorized but not steerable, then it is generally not possible to mitigate this type of co-channel interference adaptively unless the sectors are separated in frequency. FIG. 6 shows an arrangement in which a pair of cells 60-1 and 60-2, via respective base stations 62-1 and 62-2, generate sectorized and steerable beams. It can be seen that, as illustrated by the relative positions of steerable beams 63 and 65, that such an arrangement can be used to provide adaptive mitigation of co-channel interference.

FIG. 7 illustrates a conventional technique for separating uplink (UL) and downlink (DL) traffic for a given antenna beam in an omni-beam or narrow-beam system. In this technique, an uplink channel $72_U$ and a downlink channel $72_D$ are separated in frequency as shown, i.e., frequency division duplexing (FDD) is used to separate uplink and downlink traffic. Users of the uplink and downlink channels $72_U$ and $72_D$ are separated in time, using sequences of time slots 74-1, 74-2, 74-3 ... and 76-1, 76-2, 76-3 ..., respectively.

The conventional techniques described above suffer from a number of disadvantages. For example, it is generally very difficult to generate narrow beams targeted to single users, as in the narrow-beam FWL system 30 of FIG. 3. In addition, narrow beams of this type are susceptible to increased interference from effects such as shadowing and problematic sidelobes. Use of narrow beams in conjunction with a TDMA technique within a given cell can lead to catastrophic interference. For example, if beams from adjacent cells overlap, there is catastrophic interference since the signals are neither separated in frequency nor in time among the different cells, but are instead separated in the spatial domain. In a high density environment, this limitation can severely restrict capacity. Another problem is that conventional FDD techniques, such as those used to separate uplink and downlink in FIG. 7, generally cannot adaptively tradeoff capacity between uplink and downlink. As a result, these FDD techniques are generally not well suited for use with, e.g., data-oriented wireless services. It is apparent from the foregoing that further improvements are needed in wireless communication techniques in order to overcome these and other problems of the prior art.

SUMMARY OF THE INVENTION

The invention provides apparatus and methods for wireless communication in fixed wireless loop (FWL) and other types of systems in which, e.g., information is communicated in a given cell of the system between subscriber units and a base station over an uplink and a downlink. In accordance with a first aspect of the invention, a code division duplex (CDD) time-slotted CDMA wireless communication system is provided. Communications on the uplink are separated from communications on the downlink using code division duplexing, and communications with different subscriber units in the cell are separated using a code division multiple access technique, e.g., time-slotted CDMA. The code division duplexing may be implemented by, e.g., assigning a first subset of a set of codes to the uplink and a second subset of the set of codes to the downlink. The code assignment process may be repeated for different time slots, such that the number of codes in the first and second subsets varies across the time slots in accordance with uplink and downlink traffic demands. The system may utilize electronically-steered beams generated by antennas associated with the base stations. Any particular beam at a given time may have a width sufficient to provide simultaneous coverage for at least n of the subscriber units at that time, where n is greater than or equal to two. The n subscriber units are assigned different codes as part of the code division multiple access technique.

In accordance with another aspect of the invention, a time division duplex (TDD) time-slotted CDMA wireless communication system is provided. Communications on the uplink are separated from communications on the downlink using time division duplexing, and communications with different subscriber units in the cell are separated using a code division multiple access technique, e.g., time-slotted CDMA. The time division duplexing may be implemented by, e.g., assigning a first subset of a set of time slots to the uplink and a second subset of the set of time slots to the downlink. The time slot assignment process may be implemented such that the assignment of time slots to uplink and downlink is varied in accordance with uplink and downlink traffic demands. A TDD time-slotted CDMA system in accordance with the invention may also make use of the above-noted electronically-steered beams, each having a width sufficient to provide simultaneous coverage for at least n subscriber units at a given time.

In accordance with another aspect of the invention, an orthogonal frequency division multiplexing (OFDM) wireless communication system is provided. Communications on the uplink are separated from communications on the downlink using OFDM. Subscriber units in the cell are separated using, e.g., code division multiple access, time division multiple access, frequency division multiple access or combinations of these and other techniques. The OFDM may involve, e.g., assigning a first subset of M OFDM carriers to the uplink and a second subset of the M carriers to the downlink. The carrier assignment process may be repeated for different time slots, such that the number of carriers in the first and second subsets varies across the time slots in accordance with uplink and downlink traffic demands.

The invention provides improved performance in wireless communication systems, particularly in applications involving heterogeneous traffic, e.g., mixed voice and data traffic, and other applications in which uplink and downlink capacity requirements are subject to large fluctuations. The invention is particularly well suited for use in applications such as omni-beam and narrow-beam FWL systems, although it can provide similar advantages in numerous other wireless communication applications.

DETAILED DESCRIPTION OF THE INVENTION

The present invention will be illustrated below in conjunction with exemplary wireless communication systems and communication techniques. It should be understood, however, that the invention is not limited to use with any particular type of communication system, but is instead more generally applicable to any wireless system in which it is desirable to provide improved performance without unduly increasing system complexity. For example, it will be apparent to those skilled in the art that the techniques are applicable to omni-beam and narrow-beam fixed wireless loop (FWL) systems, CDMA systems, as well as to other types of wideband and narrowband wireless systems. The term "subscriber unit" as used herein is intended to include fixed terminals such as fixed wireless installations, mobile terminals such as cellular telephones and portable computers, as well as other types of system terminals. The term "separating" as applied, e.g., to uplink and downlink or subscriber units in a given cell of a system, refers generally to implementing the system such that interference between, e.g., the uplink and downlink or the subscriber units, is reduced, minimized, or eliminated.

Figure 7:
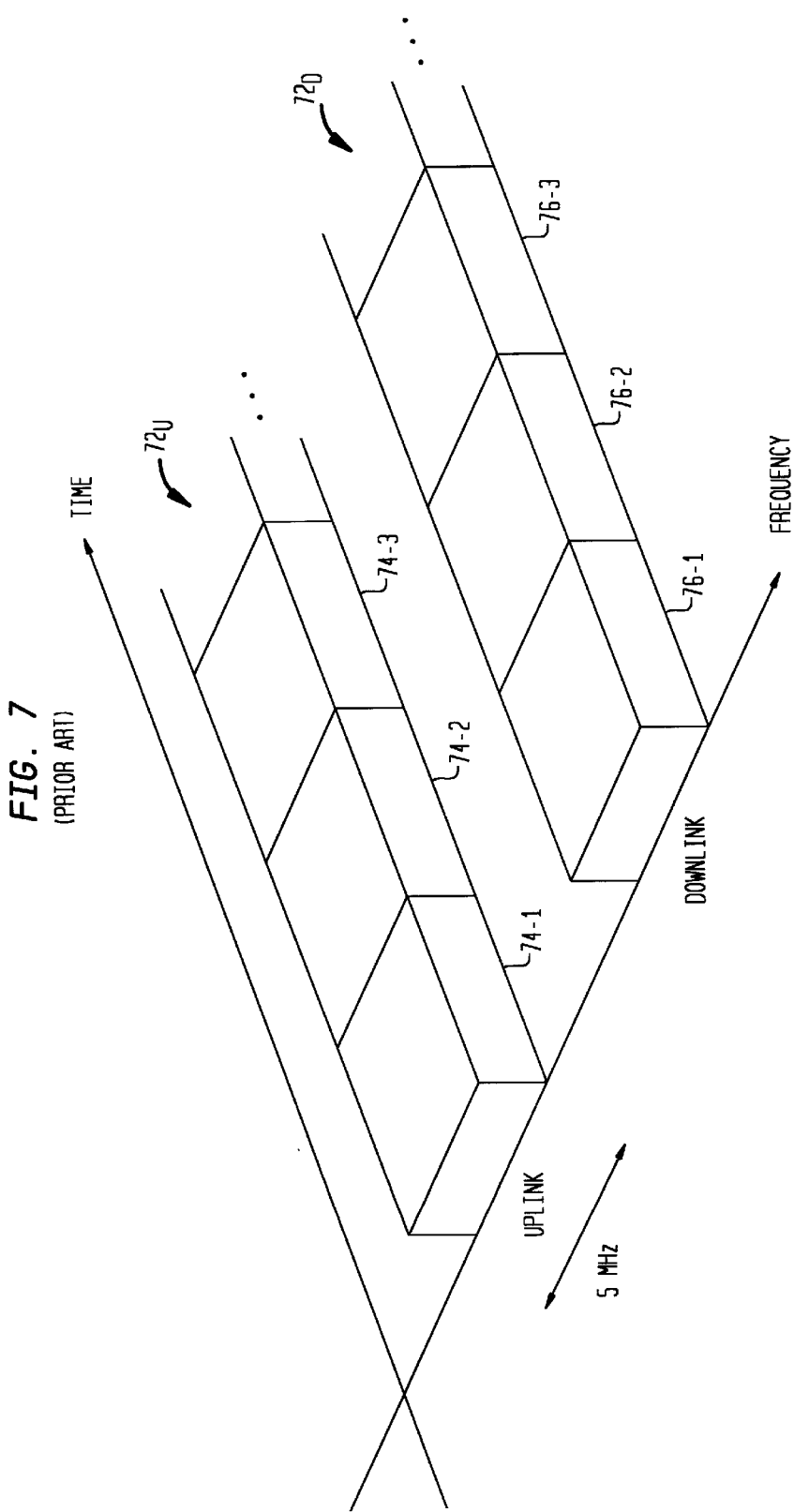
FIG. 7 illustrates a conventional technique which utilizes frequency division duplexing (FDD) to separate uplink and downlink and a TDMA technique to separate users.

The invention provides a number of communication techniques for overcoming the above-noted problems of the prior art. The techniques differ in terms of the manner in which uplink and downlink portions of the system are separated, and/or the manner in which users are separated within a given cell. As noted previously, conventional techniques generally separate uplink and downlink portions of the system using frequency, e.g., FDD as shown in FIG. 7, and separate users within a given cell using, e.g., time slots as shown in FIG. 7 or codes. In a first technique in accordance with the invention, referred to herein as code division duplex (CDD) time-slotted CDMA, uplink and downlink portions of the system are separated using codes, while the users are also separated using codes. In a second technique in accordance with the invention, referred to herein as time division duplex (TDD) time-slotted CDMA, uplink and downlink portions of the system are separated using time slots, while the users are separated using codes. In a third technique in accordance with the invention, referred to herein as orthogonal frequency division multiplexing (OFDM), uplink and downlink portions of the system are separated in frequency, while the users are also separated in frequency. Each of these techniques will be described in greater detail below.

Figure 1:
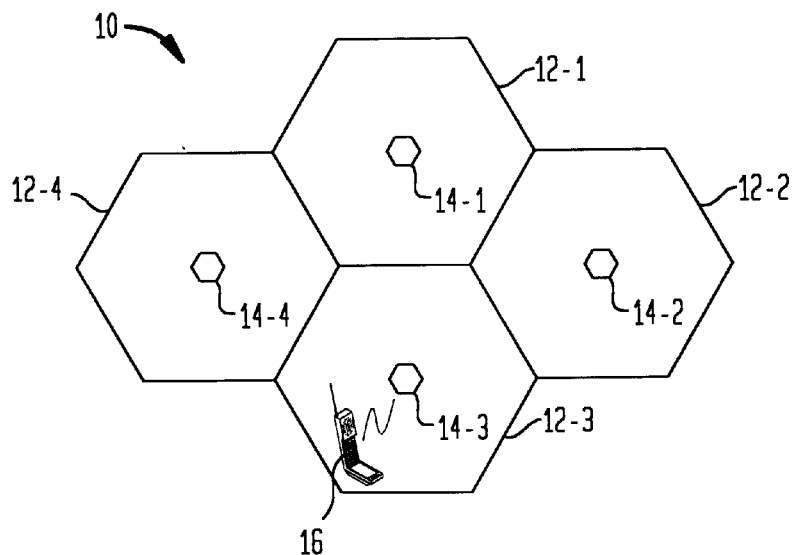
FIG. 1 shows a portion of a conventional omni-beam FWL system.
Figure 2:
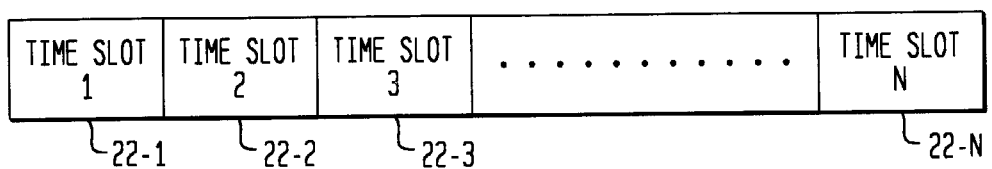
FIG. 2 illustrates a conventional TDMA technique for use in the FWL system of FIG. 1.
Figure 3:
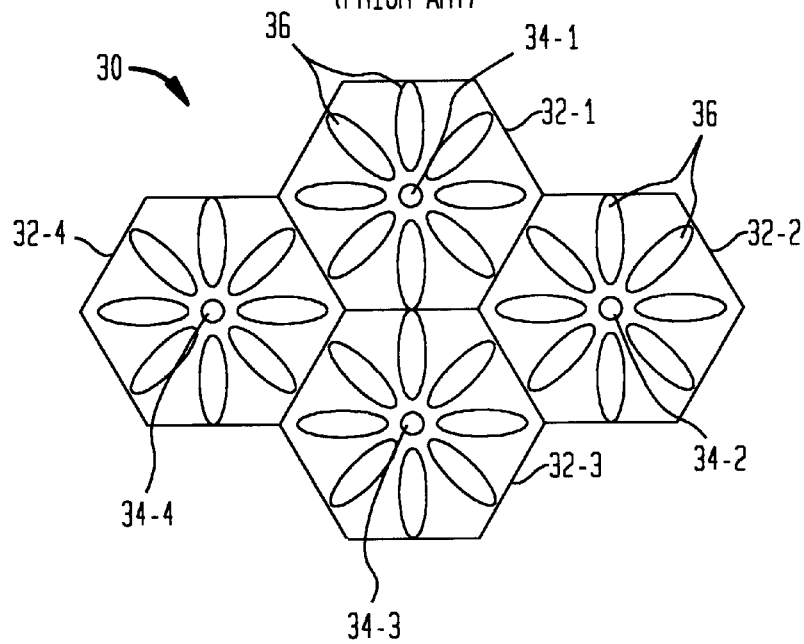
FIG. 3 shows a portion of a conventional narrow-beam FWL system.
Figure 4:
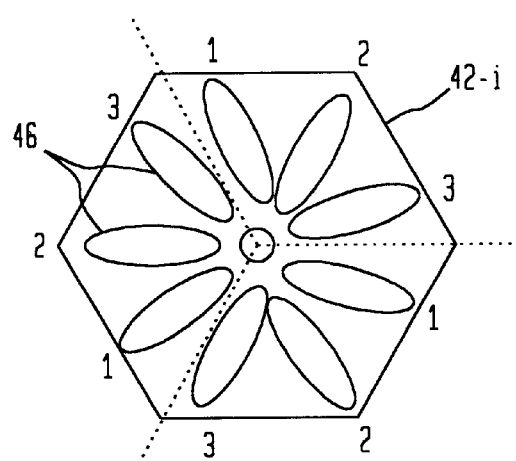
FIG. 4 illustrates an example of sectorization in a narrow-beam FWL system.
Figure 5:
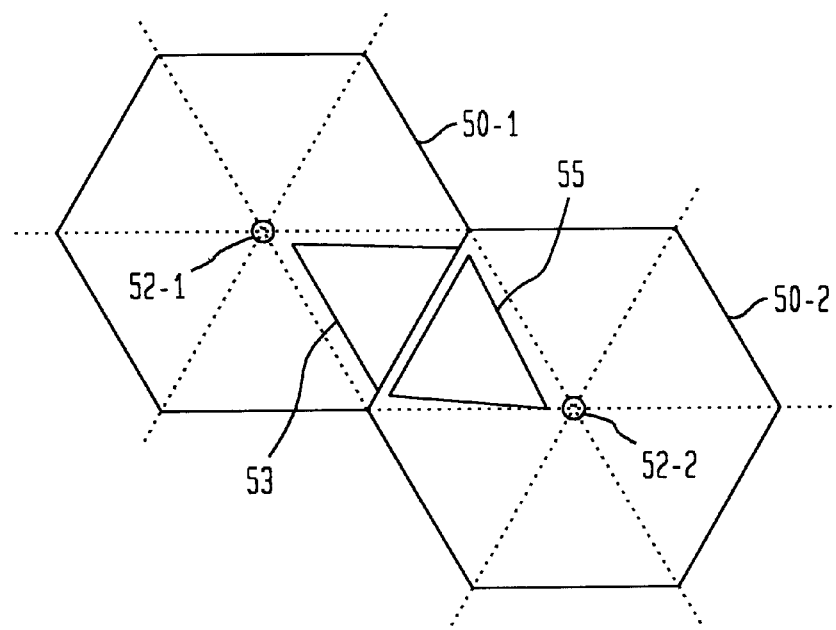
FIGS. 5 and 6 illustrate distinctions between conventional sectorized and steerable beams.
Figure 6:
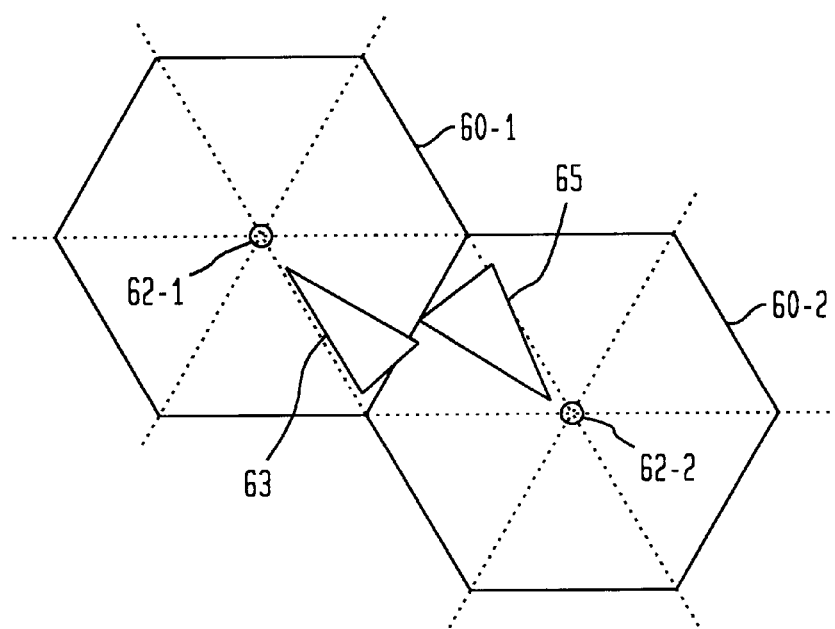
Figure 8:
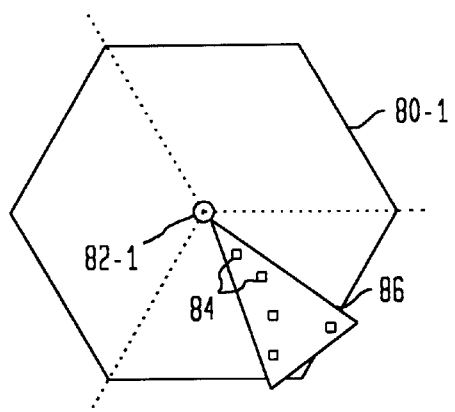
FIGS. 8 and 9 illustrate a code division duplex (CDD) time-slotted CDMA technique in accordance with the invention.

An illustrative embodiment of the CDD time-slotted CDMA technique of the invention will be described with reference to FIGS. 8 and 9. FIG. 8 shows a single cell 80-1 of a wireless system. The cell includes a base station 82-1 and a number of subscriber units 84. As shown, a single antenna beam 86 generated by the base station 82-1 is directed to several subscriber units, i.e., five subscriber units in this example. The beam 86 is approximately 40° wide, such that there will be a total of nine beams generated in each cell. The additional beams are omitted from FIG. 8 for clarity of illustration. It is also assumed that the beams in the cell 80-1 and the other cells of the corresponding system are electronically steerable. The beam 86 in FIG. 8 is purposely made wider than the typical single-user narrow beam in a conventional system such as system 30 of FIG. 3, in order to target more than one subscriber unit. Although the beam 86 is broader than, e.g., the beam 63 or 65 in FIG. 6, it can be configured to span a smaller portion of its sector. Within a given cell, such as cell 80-1, users are separated by codes, i.e., assigned different codes to prevent the users in the beam 86 from interfering with one another. Among adjacent cells, users are also separated by codes. Thus, when beams from adjacent cells collide, the interference will not be catastrophic since the users in adjacent cells are separated by codes. Standard CDMA techniques, such as those described in the above-cited CDMA references, may be used to separate the users within a cell and among adjacent cells. The technique is "time-slotted" in that the beams are steerable, such that different beams can be activated in different time slots, and may also be referred to as "discontinuous-transmission" CDMA.

Figure 9:
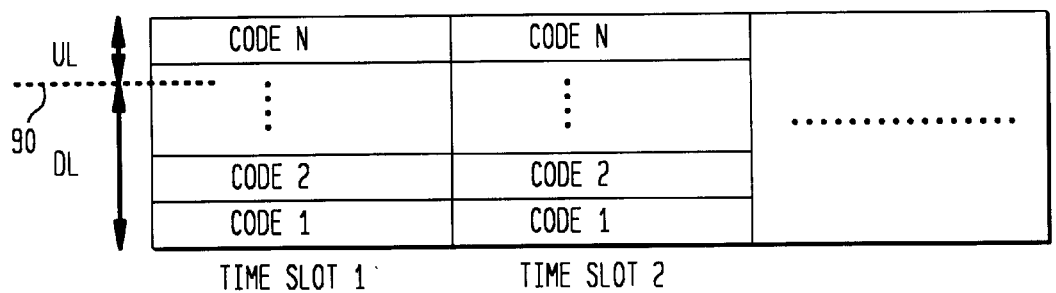

FIG. 9 shows an exemplary CDD mechanism suitable for use in the CDD time-slotted CDMA technique of the invention. In this embodiment, the CDD mechanism is implemented by using different codes for the uplink and downlink portions of the system. For example, as shown, the uplink uses code N, code N−1, etc., while code 1, code 2, etc., are used for the downlink. The boundary 90 between the uplink codes and the downlink codes is variable, such that the capacity allocated to uplink and downlink can be adaptively altered to account for demand variations. For example, the boundary 90 can vary for each time slot, or for each group of a predetermined number of time slots.

The CDD time-slotted CDMA technique described above provides a number of advantages over conventional techniques. For example, a system implemented using such a technique does not require an unduly narrow beam designed to target a single subscriber unit. In addition, uplink and downlink can be traded off by reassignment of uplink and downlink codes, and an efficient closed loop power control process can be maintained since both the uplink and downlink can be on the same frequency. A fixed quality of service (QoS) can be provided for a given user by utilizing the same uplink-downlink code boundary for each slot assigned to that user. Moreover, the variable boundary makes it easier to accommodate variable rate users, e.g., through multicode or variable rate spreading, and to transmit heterogeneous traffic, e.g., voice and data traffic.

Figure 10:
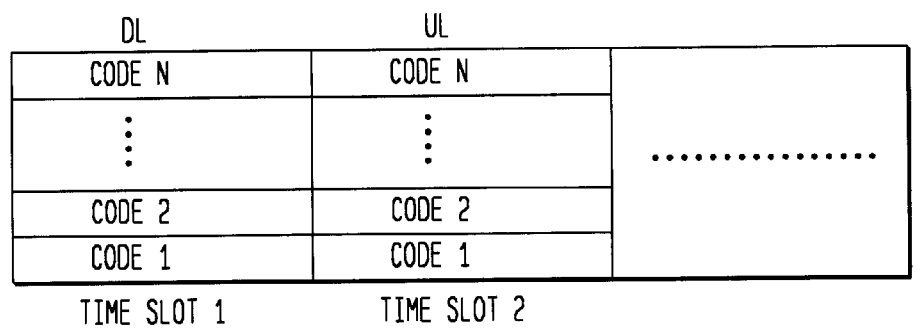
FIG. 10 illustrates a time division duplex (TDD) time-slotted CDMA technique in accordance with the invention.

FIG. 10 illustrates a TDD time-slotted CDMA technique in accordance with the invention. This technique is the same as the CDD time-slotted CDMA technique described in conjunction with FIGS. 8 and 9, except that a different duplexing mechanism, i.e., a time division rather than code division technique, is used to separate the uplink and downlink portions of the system. FIG. 10 illustrates the duplexing used in the TDD time-slotted CDMA technique. One or more of the time slots are assigned to the downlink, while others are assigned to the uplink. The assignment of time slots to uplink or downlink may be varied adaptively, so as to accommodate variations in uplink and downlink traffic demands. The other aspects of the system are otherwise the same as in the CDD time-slotted CDMA technique, i.e., beams of the type described in FIG. 8 may be used, and users are separated within a given cell and among adjacent cells through the use of codes.

Figure 11:
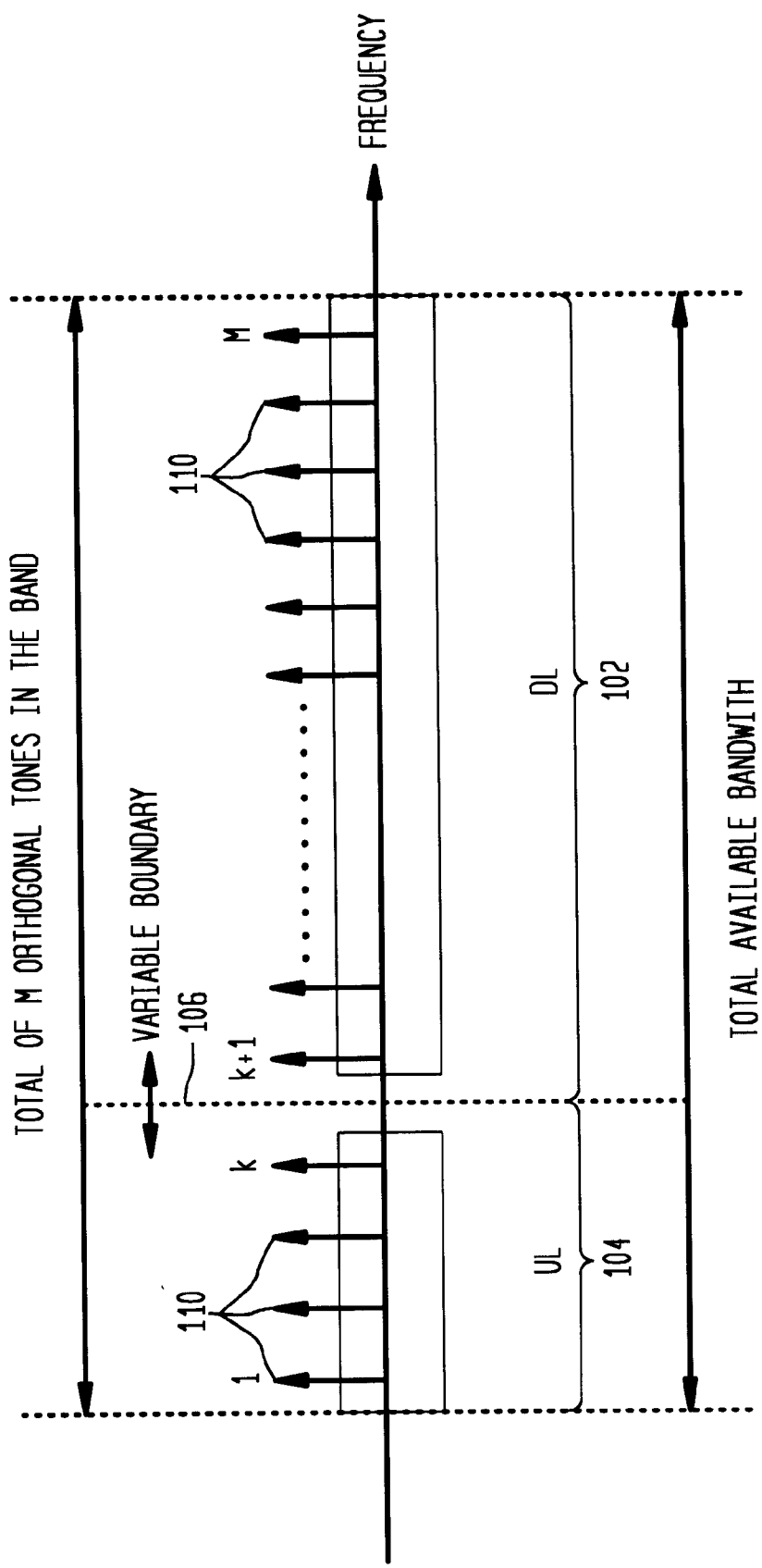
FIG. 11 illustrates an orthogonal frequency division multiplexing (OFDM) technique in accordance with the invention.

FIG. 11 illustrates an OFDM technique in accordance with the invention. In this technique, duplexing between the uplink and downlink portions is performed adaptively in the frequency domain, using orthogonal frequency tones, rather than the conventional FDD as described in conjunction with FIG. 7. This technique allows for asymmetric uplink and downlink capacity. As shown in FIG. 11, a downlink portion 102 and an uplink portion 104 are separated in frequency by a variable boundary 106. There are a total of M orthogonal frequency tones 110 in the band of interest. In the FIG. 11 example, tones 1 through k are assigned to the uplink portion 104, while tones k+1 to M are assigned to the downlink portion 102. Unlike the conventional FDD technique, this OFDM technique allows frequencies to be assigned adaptively between uplink and downlink in order to accommodate variations in demand. Within a given cell, uplink and downlink portions may be separated, e.g., in the discrete Fourier transform (DFT) domain based on assignment of OFDM carriers. Users within a given beam can be separated, e.g., by using different time slots or different codes, or other suitable techniques. Users separation among different beams of a given cell may be implemented using different codes. Among adjacent cells, frequencies or codes may be used to separate the various users.

In the OFDM technique of FIG. 11, appropriate timing synchronization is generally required between the base station and the subscriber unit in order to maintain tone orthogonality. This timing synchronization can be easily achieved through a "sync" control channel transmitted by the base station to the subscriber unit. Frequency synchronization is also generally required between the base station and the subscriber unit. Since the subscriber unit in the illustrative embodiment is fixed, there is no frequency offset due to Doppler effects. Hence, frequency synchronization in such a system can be implemented in a straight forward manner. Accurate power control is also generally required between the base station and the subscriber unit. Again, since the subscriber unit is fixed, the time variation of the wireless channel is very slow, which allows for straight forward implementation of accurate power control.

Figure 12:
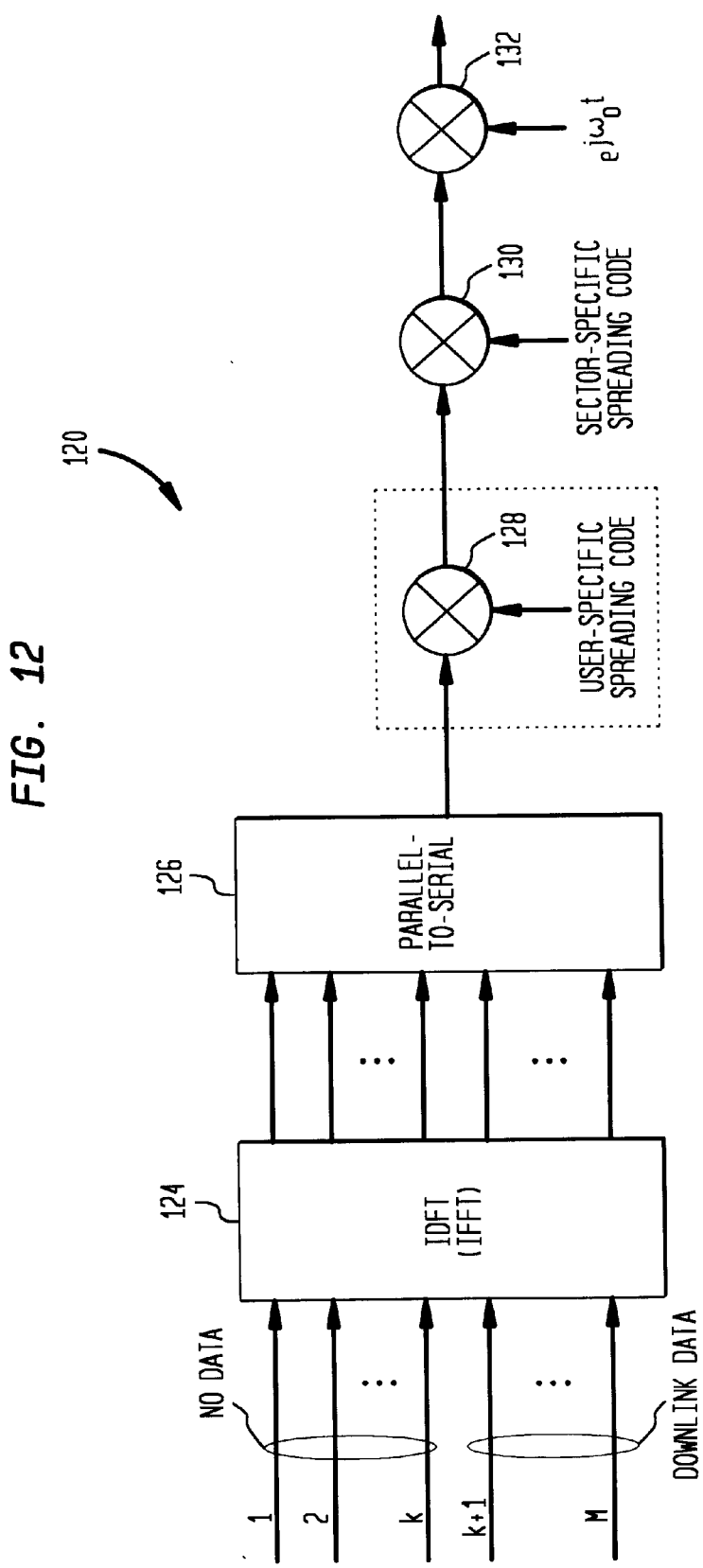
FIGS. 12 and 13 show a downlink transmitter and a downlink receiver, respectively, for implementing the OFDM technique of FIG. 11.

FIG. 12 shows a downlink, i.e., base-to-subscriber, transmitter 120 in accordance with the invention, suitable for use with the OFDM technique of FIG. 11. The transmitter 120 includes an inverse DFT (IDFT) or inverse fast Fourier transform (IFFT) element 124, a parallel-to-serial converter 126, and multipliers 128, 130 and 132. The M orthogonal frequency tones are applied to the IDFT or IFFT element 124. The first k of the M tones, which are assigned to the uplink portion 104, contain no data, e.g., all zero levels. Tones k+1 to M, which are assigned to the downlink portion 102, contain the downlink data, e.g., +1 and −1 levels. The element 124 generates the inverse transform of the M applied tones, and its output is supplied to the parallel-to-serial converter 126. The serial output of converter 126 is supplied to multiplier 128 in which the serial output is multiplied by a user-specific spreading code. The multiplier 128 is shown in a dashed box to indicate that it is an optional element. It presence will depend on whether the users in a beam are separated using codes, i.e., multiplier 128 will be present if the users in a beam are separated using codes. The output of the multiplier 128 is then multiplied by a sector-specific spreading code in multiplier 130, and the resulting signal is modulated onto a carrier corresponding to frequency $\omega_0$ in multiplier 132. The output of multiplier 132 is a downlink signal which is transmitted from the base station to a subscriber unit.

Figure 13:
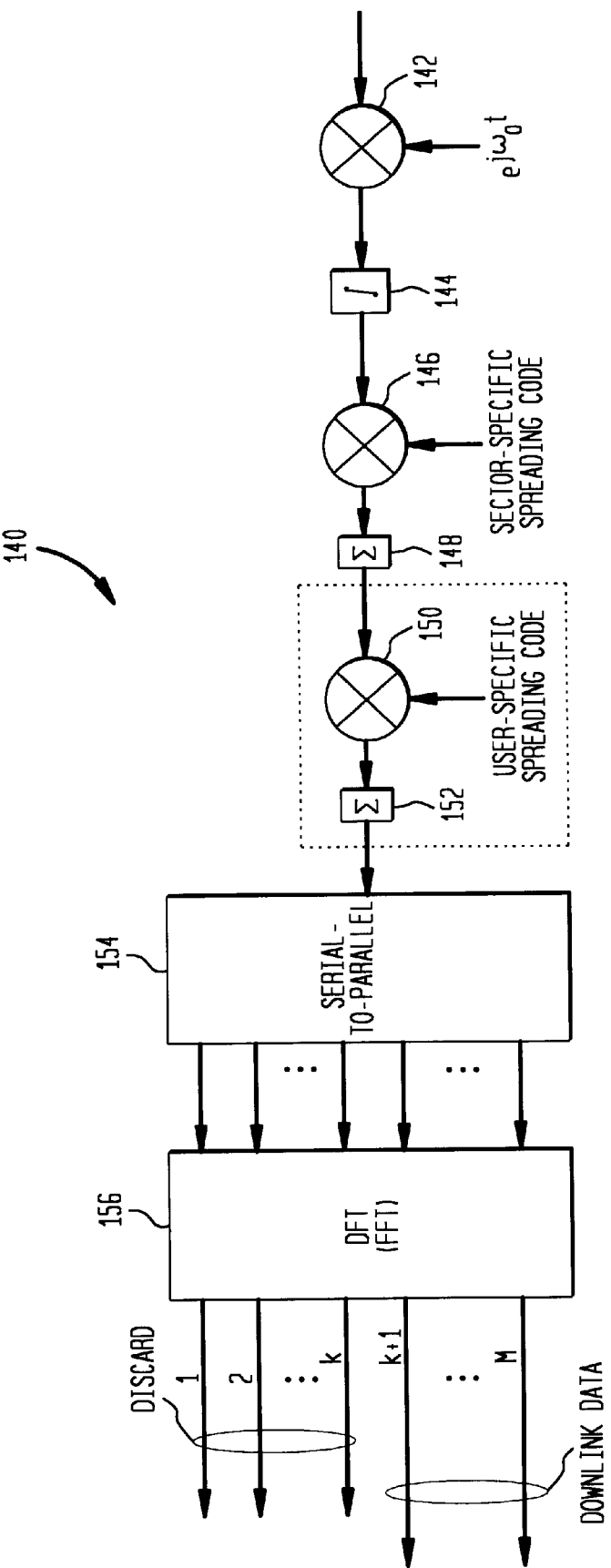

FIG. 13 shows a corresponding downlink receiver 140 which may be implemented in the subscriber unit. The receiver 140 demodulates the received downlink signal using multiplier 142, and the demodulated signal is low-pass filtered using integrator 144. The filtered signal is de-spread by multiplying it by the sector-specific spreading code in multiplier 146, and summing in a sum element 148. If necessary, i.e., if the users in a beam are separated using codes, the output of sum element 148 is multiplied by the user-specific spreading code in multiplier 150 and then summed in a sum element 152. Otherwise, the elements 150, 152 may be eliminated and the output of sum element 148 is applied directly to a serial-to-parallel converter 154. The parallel outputs of the converter 154 are applied to a DFT or FFT element 156, which performs a DFT or FFT operation to recover the M tones. The first k tones, assigned to the uplink, do not include downlink data and are therefore discarded. The downlink data is present on tones k+1 to M.

Figure 14:
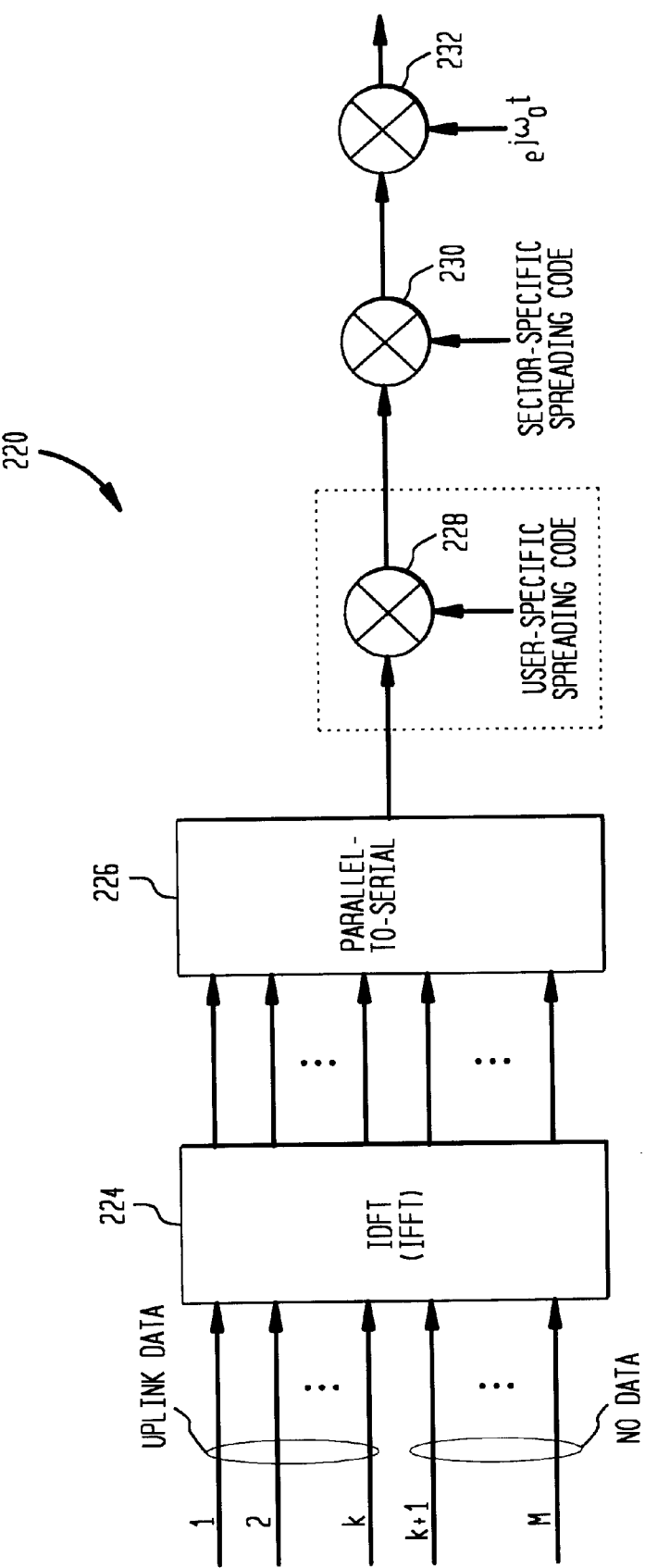
FIGS. 14 and 15 show an uplink transmitter and an uplink receiver, respectively, for implementing the OFDM technique of FIG. 11.
Figure 15:
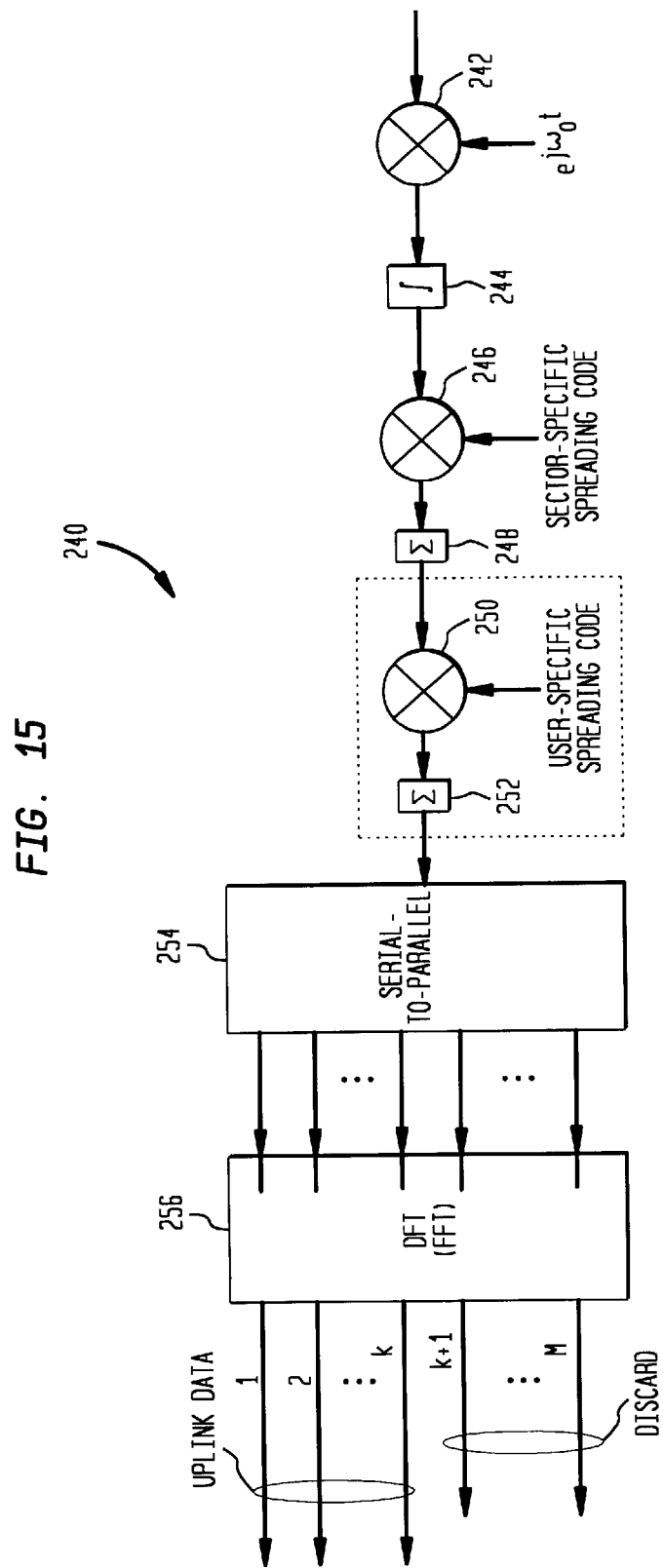

FIGS. 14 and 15 show an uplink, i.e., subscriber-to-base, transmitter and an uplink receiver, respectively, for implementing the OFDM technique of FIG. 11. The uplink transmitter 220 of FIG. 14 includes an IDFT or IFFT element 224, a parallel-to-serial converter 226, an optional user-specific spreading code multiplier 228, a sector-specific spreading code multiplier 230, and a multiplier 232 for modulating the downlink signal onto a carrier. These elements operate in substantially the same manner as the corresponding elements of the downlink transmitter 120 of FIG. 12, but the uplink data is applied to the first k tones, while tones k+1 through M contain no data. The output of multiplier 232 is an uplink signal which is transmitted from a subscriber unit to a base station. FIG. 15 shows the corresponding uplink receiver 240 which may be implemented in a base station. The receiver 240 includes a demodulating multiplier 242, an integrator 244, a sector-specific spreading code multiplier 246 and associated sum element 248, an optional user-specific spreading code multiplier 250 and its associated sum element 252, a serial-to-parallel converter 254, and a DFT or FFT element 256. These elements operate in substantially the same manner as the corresponding elements of the downlink receiver 140 of FIG. 13, but the uplink data is present on the first k tones, while the tones k+1 through M do not include uplink data and are discarded.

Figure 16:
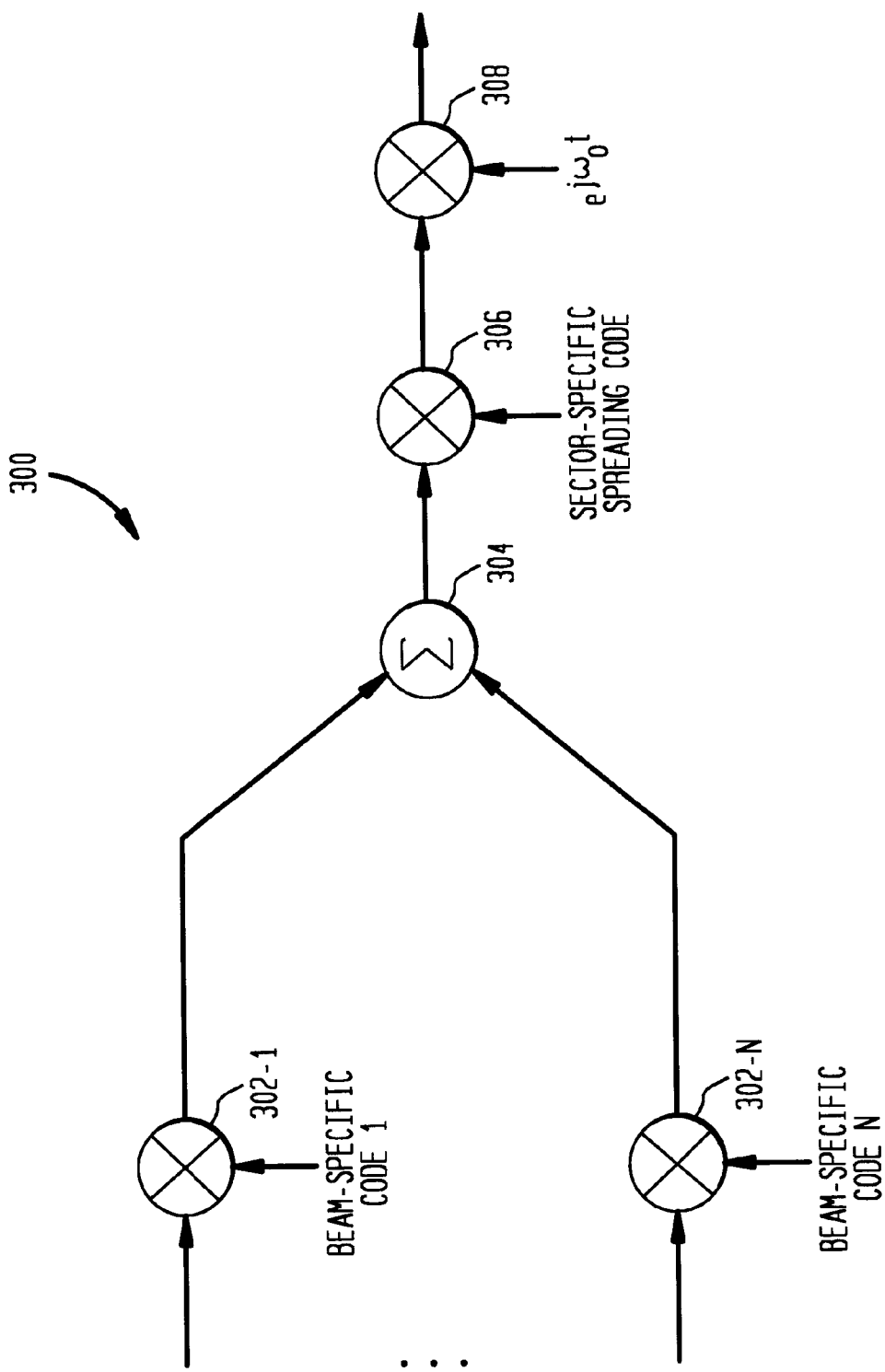
FIGS. 16 and 17 show a multi-code CDMA transmitter and a multi-code CDMA receiver, respectively, in accordance with the invention.
Figure 17:
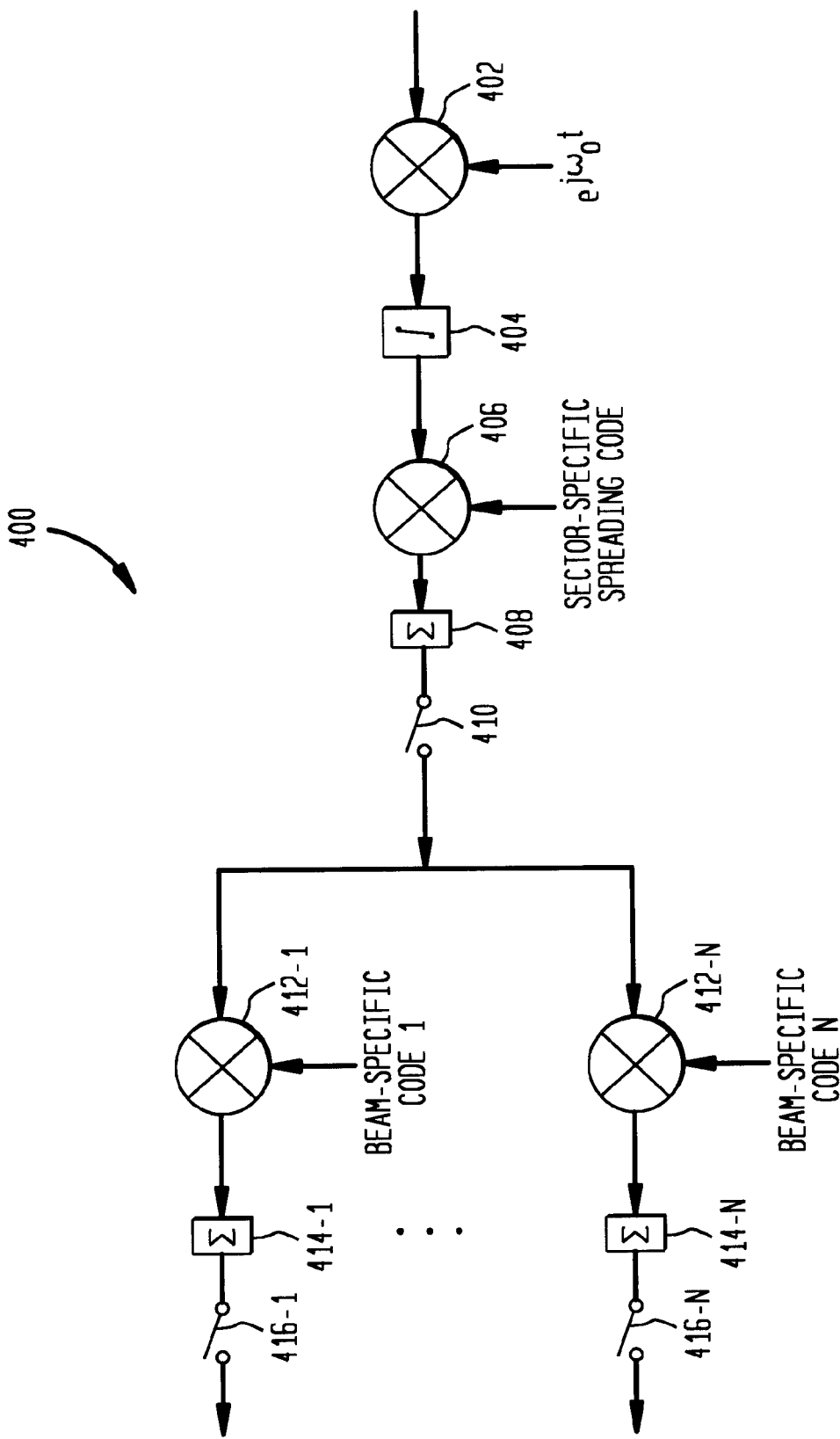

FIGS. 16 and 17 show a multi-code CDMA transmitter 300 and a multi-code CDMA receiver 400, respectively, in accordance with the invention. The transmitter 300 and receiver 400 are suitable for use with, e.g., the above-described CDD time-slotted CDMA and TDD time-slotted CDMA techniques of the invention. In the transmitter 300 and receiver 400, it is assumed that there are a total of N spreading codes per beam in a given sector or cell of the system. The transmitter 300 receives N input signals in corresponding beam-specific code multipliers 302-i, i=1, 2, . . . N. The outputs of the multipliers 302-i are summed in element 304, and then multiplied by a sector-specific spreading code in multiplier 306. The output of multiplier 306 is modulated onto a carrier corresponding to frequency $\omega_0$ in multiplier 308. The resulting output signal may be transmitted from a base station to one or more subscriber units.

The multi-code CDMA receiver 400 receives an input signal which is demodulated in multiplier 402, low-pass filtered in integrator 404, and then de-spread using the sector-specific spreading code in a multiplier 406 and associated sum element 408. A sampling switch 410 is controlled so as to "dump" samples every symbol time. The samples are de-spread in multipliers 412-i, i=1, 2, . . . N, and associated sum elements 414-i, using corresponding beam-specific codes. Sampling switches 416-i deliver a separate output for each of the beam-specific codes. The receiver 400 may be implemented in a base station to process signals received from multiple subscriber units of the system.

It should be emphasized that the exemplary wireless systems and devices described herein are intended to illustrate the operation of the invention, and therefore should not be construed as limiting the invention to any particular embodiment or group of embodiments. For example, although well suited for implementation in an omni-beam or narrow-beam FWL system, the invention can be used in other applications. In addition, a system in accordance with the invention may include additional elements, such as, for example, mobile switching centers (MSCs) for connecting one of more of the base stations to a public switched telephone network (PSTN), and a memory for storing, e.g., user data and billing information. Furthermore, it will be apparent to those skilled in the art that the transmitters and receivers shown herein for purposes of illustrating the invention may be implemented in many different ways, and may include a number of additional elements, e.g., diplexers, downconverters, upconverters, signal sources, filters, demodulators, modulators, baseband signal processors, etc., configured in a conventional manner. These and numerous other alternative embodiments within the scope of the following claims will therefore be apparent to those skilled in the art.

What is claimed is:

1. A method of communicating information in a wireless cellular communication system, the method comprising the step of:

communicating information between a plurality of subscriber units of the system and a base station in a cell of the system over at least one of an uplink and a downlink, wherein communications on the uplink are separated from communications on the downlink using time division duplexing;

wherein communications between the base station and at least a subset of the plurality of subscriber units in the cell are separated using a code division multiple access technique; and wherein each of the subscriber units within a given antenna beam associated with a given sector of the base station is assigned a distinct beam-specific spreading code, the beam-specific spreading code being used in conjunction with a sector-specific spreading code to separate the communications between the base station and the subscriber units within the given antenna beam in accordance with the code division multiple access technique.

2. The method of claim 1 wherein the system is a fixed wireless loop system.

3. The method of claim 1 wherein the code division multiple access technique is time-slotted code division multiple access.

4. The method of claim 1 wherein the given antenna beam comprises an electronically-steered beam at a particular point in time, and has a width sufficient to provide simultaneous coverage for at least n of the plurality of subscriber units at that time, where n is greater than or equal to two.

5. The method of claim 1 wherein the time division duplexing further includes the step of assigning a first subset of a set of time slots to the uplink and a second subset of the set of time slots to the downlink.

6. The method of claim 5 further including the step of varying the assignment of time slots to uplink and downlink in accordance with uplink and downlink traffic demands.

7. An apparatus for communicating information in a wireless communication system, the apparatus comprising:

a base station operative to communicate with a plurality of subscriber units in a cell of the system over at least one of an uplink and a downlink, wherein communications on the uplink are separated from communications on the downlink using time division duplexing, and communications between the base station and at least a subset of the plurality of subscriber units in the cell are separated using a code division multiple access technique;

wherein each of the subscriber units within a given antenna beam associated with a given sector of the base station is assigned a distinct beam-specific spreading code, the beam-specific spreading code being used in conjunction with a sector-specific spreading code to separate the communications between the base station and the subscriber units within the given antenna beam in accordance with the code division multiple access technique.

8. The apparatus of claim 7 wherein the system is a fixed wireless loop system.

9. The apparatus of claim 7 wherein the code division multiple access technique is time-slotted code division multiple access.

10. The apparatus of claim 7 wherein the given antenna beam comprises an electronically-steered beam at a particular point in time, and has a width sufficient to provide simultaneous coverage for at least n of the plurality of subscriber units at that time, where n is greater than or equal to two.

11. The apparatus of claim 7 wherein the base station is further operative to assign a first subset of a set of time slots to the uplink and a second subset of the set of time slots to the downlink.

12. The apparatus of claim 11 wherein the base station is further operative to vary the assignment of time slots to uplink and downlink in accordance with uplink and downlink traffic demands.

13. An apparatus for communicating information in a wireless communication system, the apparatus comprising:

a first subscriber unit operative to communicate with a base station in a cell of the system over at least one of an uplink and a downlink, wherein communications on the uplink are separated from communications on the downlink using time division duplexing, and communications between the base station and at least one other subscriber unit in the cell are separated from communications between the base station and the first subscriber unit using a code division multiple access technique;

wherein each of the subscriber units within a given antenna beam associated with a given sector of the base station is assigned a distinct beam-specific spreading code, the beam-specific spreading code being used in conjunction with a sector-specific spreading code to separate the communications between the base station and the subscriber units within the given antenna beam in accordance with the code division multiple access technique.

14. The apparatus of claim 13 wherein the system is a fixed wireless loop system.

15. The apparatus of claim 13 wherein the code division multiple access technique is time-slotted code division multiple access.

16. The apparatus of claim 13 wherein the given antenna beam comprises an electronically-steered beam at a particular point in time, and has a width sufficient to provide simultaneous coverage for at least n subscriber units at that time, where n is greater than or equal to two.

17. The apparatus of claim 13 wherein the time division duplexing assigns a first subset of a set of time slots to the uplink and a second subset of the set of time slots to the downlink.

18. The apparatus of claim 17 wherein the assignment of codes to uplink and downlink is repeated for each of a plurality of time slots, such that the number of codes in the first and second subsets varies in accordance with uplink and downlink traffic demands.

* * * * *